Figure 1:
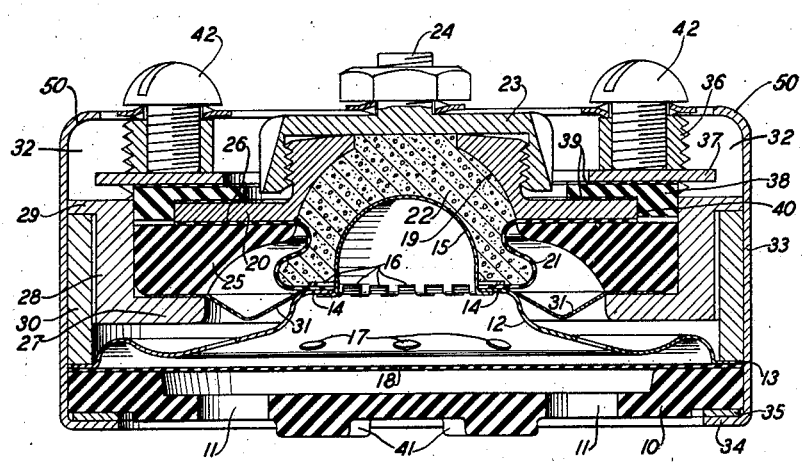

Nov. 4, 1947.    H. W. BRYANT    2,429,988
TEMPERATURE COMPENSATED MICROPHONE
Filed Dec. 28, 1943

INVENTOR
H. W. BRYANT
BY
Walter C. Kiesel
ATTORNEY

Patented Nov. 4, 1947

2,429,988

UNITED STATES PATENT OFFICE 2,429,988

TEMPERATURE COMPENSATED MICROPHONE

Herbert W. Bryant, Summit, N. J., assignor to Bell Telephone Laboratories, Incorporated, New York, N. Y., a corporation of New York Application December 28, 1943, Serial No. 515,880

9 Claims. (Cl. 179—122)

This invention relates to signal translating devices and, more particularly, to carbon granule type telephone transmitters especially suitable for use in aircraft.

Telephone transmitters employed in aircraft are subjected to a wide range of temperatures. For example, in airplanes flying at high altitudes, temperatures as low as 40 degrees below zero Fahrenheit are encountered. The effect of temperature variations is to alter the form and relation of the constituent components of the transmitter, because of contraction and expansion, with consequent changes in the output level and operating characteristics of the transmitter. For example, in carbon granule transmitters of known design, at low temperatures, such as are encountered at high altitudes, the contraction of the elements is such as to result in a decrease in the interelectrode spacing with a consequent increase of the static pressure on the granules and marked reduction in the resistance of the granule path between the electrodes and a corresponding variation in operating characteristics.

The effects of temperature variations upon the operating characteristics of a telephone transmitter may be reduced somewhat by the use of special materials for certain of the parts. However, this expedient is not fully satisfactory and such materials, as a rule, involve special handling and treatment and it is not feasible nor economic to manufacture such parts in quantity.

One object of this invention is to increase the thermal stability of signal translating devices, such as carbon granule type telephone transmitters, whereby the effects of temperature variations, to which the devices may be subjected, upon the operating characteristics of the devices are minimized and a substantially constant output level over a wide range of temperatures is realized.

Another object of this invention is to expedite the manufacture of carbon granule type transmitters intended for use in aircraft and in other locations where wide temperature ranges are encountered.

In one illustrative embodiment of this invention a carbon granule transmitter comprises a diaphragm, a pair of electrodes one of which is coupled to the diaphragm, supports for the diaphragm and the other of the electrodes, and a spacer member between the supports.

In accordance with one feature of this invention, the constituent parts of the transmitter entering into the determination of the spacing of the two electrodes are so constructed and arranged that the net effect of contraction and expansion thereof with temperature variations, upon the electrode spacing is substantially zero. In accordance with one specific feature of this invention, the spacer member is made of a nickel steel, known commercially as "Nilvar," having a temperature coefficient of approximately $1 \times 10^{-6}$ centimeter per degree C. per centimeter and the support for the other electrode mentioned is of such configuration that the effect of its contraction and expansion, upon the electrode spacing substantially counteracts the effect of contraction and expansion of the electrode coupled to the diaphragm and the support for the diaphragm.

Figure 2:
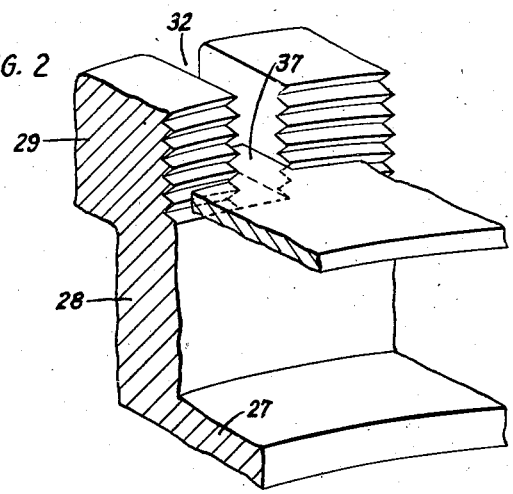

The invention and the above noted and other features thereof will be understood more clearly and fully from the following detailed description with reference to the accompanying drawing in which Fig. 1 is a diametral section view of a carbon granule telephone transmitter illustrative of one embodiment of this invention and Fig. 2 is a fragmentary perspective view showing details of elements of the transmitter.

Referring now to the drawing, the transmitter illustrated therein comprises a face plate or grid 10 provided with a plurality of apertures 11 and mounting a diaphragm 12. The diaphragm is generally frusto-conoidal in form and includes a peripheral flange 13 secured to the face plate and a flange portion 14 to which a substantially hemispherical front electrode 15 is secured, as by tabs 16 extending from the front electrode. The diaphragm may be provided with restricted apertures 17 constituting leakage paths from the chamber in front of the diaphragm and serving to prevent excessive low frequency response of the transmitter.

Interposed between the diaphragm 12 and the face plate or grid 10 is a moisture repellant screen 18, for example of oiled silk, which is fastened to the grid 10 and protects the diaphragm against moisture.

Mounted in alignment with the front electrode 15 is a fixed or back electrode having a substantially hemispherical inner surface 19 and a supporting flange 20. The front and back electrodes together with a flexible cylindrical wall member 21 define a chamber which is substantially filled with comminuted resistance material 22, such as carbon granules. The chamber is closed by a flanged cap 23 threaded upon the back electrode and provided with a threaded terminal 24.

The flange 20 of the back electrode is mounted upon an annular member 25 and secures the flange 26 of the wall member 21 thereto. The annular member 25 in turn is seated upon an annular flange 27 of a cylindrical support 28, the support 28 having a second flange 29, provided with diametral slots 32, which is seated upon a cylindrical spacer 30 engaging the flange 13 of the diaphragm 12 and fixing the flange 13 to the face plate 10. The diameters of support 28 and spacer 30 are such that a slight clearance between these elements obtains at all operating temperatures so that relative axial motion between these elements may occur freely. Secured between the annular member 25 and the flange 27 are flexible conductors 31 extending from the front electrode 15.

The face plate 10, diaphragm 12, spacer 30 and support 28 are securely clamped together by a ferrule 33 having at one end an annular flange 34 bearing against a washer 35 and having its other end crimped over the flange 29 as indicated at 50 in Fig. 1. Threaded to the flange 29 is a lock ring 36 which bears against a shim 37, having ears fitted in slots 32, seated upon an annular spacer 38 in turn seated upon the flange 20 of the back electrode. Suitable washers 39 are interposed between the spacer 38 and the flange 20 and shim 37. As shown in the drawing, the spacer 38, which advantageously is of insulating material, fits within the support 28 and has an annular surface 40 which fits around the edge of the flange 20 so that the back electrode is accurately centered with respect to the support 28. The latter fits within the spacer 30 and thus centers the back electrode assembly with respect to the front electrode. Terminal screws 42, threaded into the lock ring 36, facilitate external connection to the front electrode 15.

In the construction described, it will be noted that the normal spacing between the back and front electrode is determined primarily by the spacer 30. This member can be readily constructed, of course, to set the normal electrode spacing at any desired value. When the transmitter is subjected to temperature variations, the parts thereof expand and contract. However, because of the construction and correlation of these parts in accordance with this invention, the net effect of such expansion and contraction upon the spacing between the front and back electrodes is substantially zero so that substantially constant operating characteristics over a wide range of temperature are realized. This will be understood from the following considerations.

Assume that, as occurs in transmitters mounted in aircraft flying at high altitudes, the temperature drops to a value considerably below that normally extant upon the ground. Then, the various parts of the transmitter, having positive temperature coefficients of expansion, contract. As is apparent the major contraction of the face plate or grid 10 is radial and, inasmuch as the diaphragm 12 has its flange 13 fixed to the face plate, the effect of contraction of the face plate is to displace the front electrode 15 toward the back electrode surface 19. This effect is opposed in part by the contraction of the diaphragm 12 and electrode 15, the effect of which is to displace the electrode 15 away from the electrode surface 19. The major contraction of the support 28 and spacer 30 is parallel to the axis of alignment of the electrodes, that is, the vertical axis of the transmitter as shown in the drawing, the radial contraction of these members having substantially no effect upon the electrode spacing. When support 28 contracts, the effect is to displace the surface 19 away from the electrode 15, the direction of displacement, it will be noted, being the same as the displacement of the electrode 15 due to contraction of the face plate or grid. The spacers 25 and 30 also contract in the direction of the axis aforenoted and the effect of this is to move the surface 19 toward the electrode 15. Contraction of the back electrode tends to displace the surface 19 toward the electrode 15.

Thus, it will be seen that the electrode spacing at any temperature is dependent upon the resultant of the contraction effects of the several parts noted, contraction of some parts tending to decrease the electrode spacing and contraction of others tending to increase the spacing. If these parts are correlated properly, the resultant of the contraction effects upon the electrode spacing will be substantially zero. The requisite correlation of the several parts in any specific construction will be dependent, of course, upon the materials and dimensions of these parts. However, because of the construction above described and particularly due to the fact that the effect of contraction of the support 28 is in opposition to the effect of contraction of the face plate 10, a resultant effect of substantially z e r o can be achieved. In any particular device wherein the electrodes, diaphragm and diaphragm support are of prescribed construction, the designed temperature compensation, that is, substantially zero resultant effect of contraction and expansion, can be realized by the provision of a spacer 30 and support 38 of proper axial dimensions. That is, the length of the spacer 30 is made such as to determine the requisite normal electrode spacing and the cylindrical portion of the support 28 is made of such length between the seating surfaces of flanges 27 and 29 that the effect of expansion and contraction of the support balances the effect of the other parts upon the electrode spacing and a resultant effect of substantially zero is achieved.

In a particularly advantageous construction, the diaphragm 12 and the spacer member 30 are made of a material, such as a nickel steel known commercially as "Nilvar," having a very low temperature coefficient of expansion. Thus, the effect of contraction of the diaphragm and spacer 30 with decreasing temperature is very small. Because of the form and dimensions thereof, the temperature effects of the back electrode and spacer 25 are relatively small. Advantageously, the spacer 25 is made of a ceramic, such as synthetic steatite, having a low linear temperature coefficient and the back electrode is made of brass. The front electrode 15 also may be of brass. The face plate or grid 10 may be of a phenolic condensation product and the support 28 may be of metal, for example, aluminum. The approximate linear temperature coefficients of the materials involved are, relatively: Nilvar—1, ceramic—6, brass—19, aluminum—23, and phenolic condensation product—50. The spacer 30 and diaphragm 12, having very small temperature coefficients, do not substantially alter the electrode spacing in response to temperature variations. The effect of contraction of the spacer 25 and of the electrode 19, 20 is small. Hence, a balance between the effects, upon the electrode spacing, of the face plate 10, electrode 15 and support 28, which balance can be achieved readily by correlation of the dimensions of these parts, results in substantially no change in electrode spacing with temperature. Of course, a more exact balance of the effects of all the parts can be obtained by correlating all these parts although, as noted heretofore, the major effects are due to the face plate 10, electrode 15 and support 28.

Although in the foregoing discussion the principles involved have been illustrated by the case wherein the parts contract due to decreasing temperature, it will be appreciated that the same principles apply for the case where the parts expand due to increasing temperature. For this case, as in the first, the effect, upon the electrode spacing, of expansion of the support 28 is opposite to and substantially balances the net effect of expansion of the face plate 10 and electrode 15. Thus, substantially constant operating characteristics for the transmitter over a wide temperature range are realized.

It will be appreciated that this invention enables the use of materials for several of the components of the transmitter, such as the electrodes, which are relatively easy to work, so that the manufacture of the transmitter is expedited.

In some cases, it is desirable to employ in connection with the transmitter an external moisture-resistant shield or cover which overlies the face plate 10. In order to prevent blocking of the openings 11 by such a screen, as is apt to occur when the screen becomes wet, guards 41 in the form of radially extending protuberances may be provided on the face plate 10.

Although a specific embodiment of this invention has been shown and described, it will be understood that it is but illustrative and that various modifications may be made therein without departing from the scope and spirit of this invention as defined in the appended claims.

What is claimed is:

1. A signal translating device comprising a diaphragm, an electrode coupled to said diaphragm, a rigid second electrode opposite said first electrode, a support to which said diaphragm is secured at its periphery, mounting means for said second electrode, and a spacer member between said support and said mounting means, said mounting means including a member depending from said spacer member and extending toward said support, said depending member having the end thereof remote from said diaphragm fixed to said spacer member and the remainder thereof free to expand and contract in the direction of opposition of said first and second electrodes, with temperature variations.

2. A telephone transmitter comprising a support, a dished diaphragm mounted on said support, a first electrode mounted on said diaphragm and extending from the convex surface thereof, a second electrode opposite said first electrode, a spacer member for determining the normal spacing of said electrodes, and means for compensating for the effects of expansion and contraction of said support and first electrode upon the spacing of said first and second electrodes, said means comprising a support member mounting said second electrode and substantially free to expand and contract with temperature variations, in the direction parallel to the spacing between said electrodes, said support member having one end fixed to said spacer member and extending therefrom toward said diaphragm, and said second electrode being mounted from the other end of said support member.

3. A telephone transmitter in accordance with claim 2 wherein said spacer member is of a nickel steel having a temperature coefficient of the order of $1 \times 10^{-6}$ centimeter per degree centigrade per centimeter.

4. A telephone transmitter comprising a face plate, a substantially frusto-conoidal diaphragm having its larger end coupled to said face plate, a first electrode coupled to said diaphragm and extending away from the smaller end thereof, a cylindrical spacer member encompassing said diaphragm and having one end seated upon said larger end thereof, a support member seated upon and having one end portion fixed to the other end of said spacer member and extending therefrom toward said diaphragm, and a second electrode opposite said first electrode and mounted from the end of said support member toward said diaphragm, said support member being unrestrained, except for said fixed end portion thereof, in the direction of the spacing between said electrodes.

5. A telephone transmitter comprising a face plate, a substantially frusto-conoidal diaphragm having its larger end seated upon said face plate and fixed thereto, a first electrode secured to the smaller end of said diaphragm and extending in the direction away from said face plate, a cylindrical spacer member having one end seated upon said larger end of said diaphragm, and encompassing said diaphragm, a support member having a cylindrical portion slidably fitted within said spacer member and freely expansible and contractile longitudinally in response to temperature variations, a flange at one end of the cylindrical portion and seated upon and fixed to the other end of said spacer member and a second flange adjacent said diaphragm, a second electrode opposite said first electrode, and a second spacer member seated upon said second flange and mounting said second electrode.

6. A telephone transmitter comprising means including a pair of juxtaposed electrodes defining a carbon granule chamber, means for mounting one of said electrodes so that the spacing between said electrodes tends to decrease due to contraction of said mounting means in accordance with decrease in the temperature thereof, means for mounting the other of said electrodes so that said spacing tends to increase due to contraction of said second mounting means with decrease in the temperature thereof, and means spacing said first and second mounting means.

7. A telephone transmitter in accordance with claim 6 wherein said spacing means is of a material having a temperature coefficient of the order of $1 \times 10^{-6}$ centimeter per degree centigrade per centimeter.

8. A telephone transmitter comprising means including a pair of juxtaposed electrodes defining a carbon granule chamber, a vibratory member coupled to one of said electrodes, a support for said vibratory member, and means for compensating for the effect of contraction and expansion of said support upon the spacing of said electrodes, said means comprising a support mounting the other of said electrodes and arranged so that expansion and contraction thereof moves said other electrode in the direction opposite to the displacement of said one electrode due to expansion and contraction of said first support.

9. A telephone transmitter in accordance with claim 8 comprising a member spacing said first and second supports and having a temperature coefficient of the order of $1 \times 10^{-6}$ centimeter per degree centigrade per centimeter.

HERBERT W. BRYANT.

REFERENCES CITED

The following references are of record in the file of this patent:

UNITED STATES PATENTS

| Number | Name | Date |
| --- | --- | --- |
| 1,570,120 | Bennett | Jan. 19, 1926 |
| 1,603,300 | Winckel | Oct. 19, 1926 |
| 2,042,822 | Bennett et al. | June 2, 1936 |
| 2,069,242 | Graham | Feb. 2, 1937 |
| 2,179,733 | Sutton | Nov. 14, 1939 |